United States Patent
Hirata et al.

(10) Patent No.: US 9,221,946 B2
(45) Date of Patent: Dec. 29, 2015

(54) POLYBUTYLENE TEREPHTHALATE RESIN PELLETS, AND PRODUCTION METHOD FOR SAID POLYBUTYLENE TEREPHTHALATE RESIN PELLETS

(71) Applicant: WinTech Polymer Ltd., Tokyo (JP)

(72) Inventors: Kunihiro Hirata, Fuji (JP); Kazuhito Suzuki, Fuji (JP); Takayuki Ishikawa, Fuji (JP)

(73) Assignee: WINTECH POLYMER LTD., Tokyo (JP)

( * ) Notice: Subject to any disclaimer, the term of this patent is extended or adjusted under 35 U.S.C. 154(b) by 72 days.

(21) Appl. No.: 14/368,935

(22) PCT Filed: Nov. 20, 2012

(86) PCT No.: PCT/JP2012/080109
§ 371 (c)(1),
(2) Date: Jun. 26, 2014

(87) PCT Pub. No.: WO2013/099476
PCT Pub. Date: Jul. 4, 2013

(65) Prior Publication Data
US 2014/0357807 A1    Dec. 4, 2014

(30) Foreign Application Priority Data
Dec. 26, 2011 (JP) ................... 2011-284399

(51) Int. Cl.
C08G 63/91 (2006.01)
B29C 47/00 (2006.01)
B29K 67/00 (2006.01)

(52) U.S. Cl.
CPC .......... C08G 63/916 (2013.01); B29C 47/0038 (2013.01); B29K 2067/006 (2013.01)

(58) Field of Classification Search
USPC ......................................................... 525/437
See application file for complete search history.

(56) References Cited

U.S. PATENT DOCUMENTS

| 2002/0141282 A1* | 10/2002 | Tanaka | B29C 47/76 366/76.1 |
| 2010/0209646 A1 | 8/2010 | Yamada | |
| 2013/0245205 A1* | 9/2013 | Yamada | C08K 3/32 525/437 |

FOREIGN PATENT DOCUMENTS

| JP | 2002-307427 A | 10/2002 | |
| JP | 2006-347151 A | 12/2006 | |
| JP | 2007-077205 A | 3/2007 | |
| JP | 2009-138179 A | 6/2009 | |
| JP | WO 2012073740 A1 * | 6/2012 | ............... C08K 3/32 |
| WO | WO 2009/050859 A1 | 4/2009 | |

OTHER PUBLICATIONS

Guo et al, "Chain Extension of Poly(butylene terephthalate) by Reactive Extrusion" Journal of Applied Polymer Science, 71 1827-1834, Mar. 1999.*
Inata et. al, "Chain Extenders for Polyesters. I. Addition-Type Chain Extenders Reactive with Carboxyl End Groups of Polyesters" Journal of Applied Polymer Science, 30 3325-3337, Aug. 1985.*
Inata et. al, "Chain Extenders for Polyesters. III. Addition-Type Nitrogen-Containing Chain Extenders Reactive with Hydroxyl End Groups of Polyesters" Journal of Applied Polymer Science, 32 4581-4594, Sep. 1986.*
Inata et. al, "Chain Extenders for Polyesters. II. Reactivities of Carboxyl-Addition-Type Chain Extenders; Bis Cyclic-Imino-Ethers" Journal of Applied Polymer Science, 32 5193-5202, Oct. 1986.*
Inata et. al, "Chain Extenders for Polyesters. IV.Properties of the Polyesters Chain-Extended by 2,2'-Bis(2-oxazoline)" Journal of Applied Polymer Science, 33 3069-3079, Jun. 1987.*
Inata et. al, "Chain Extenders for Polyesters. V.Reactivities of Hydroxyl-Addition-Type Chain Extender; 2,2'-Bis(4H-3,1-Benzoxazin-4-one)" Journal of Applied Polymer Science, 34, 2609-2617, Nov. 1987.*
Inata et. al, "Chain Extenders for Polyesters. VI. Properties of the Polyesters Chain Extended by 2,2'-Bis(4H-3,1-Benzoxazin-4-one)" Journal of Applied Polymer Science, 34, 2769-2776, Dec. 1987.*
Office Action issued to TW Application No. 101145800, mailed Feb. 13, 2015.

* cited by examiner

Primary Examiner — Randy Gulakowski
Assistant Examiner — Christopher M Rodd
(74) Attorney, Agent, or Firm — Knobbe Martens Olson & Bear LLP

(57) ABSTRACT

Provided is technology that causes polybutylene terephthalate resin to react with a reactive compound and reduces the thermal decomposition of the polybutylene terephthalate resin, when performing reactive processing method using the polybutylene terephthalate resin. During production of polybutylene terephthalate resin pellets, the polybutylene terephthalate resin (A) and a reactive compound (B) that reacts with the polybutylene terephthalate resin (A) are reacted such that the difference between the intrinsic viscosity of a polybutylene terephthalate resin composition configuring the polybutylene terephthalate resin pellets and the intrinsic viscosity of a polybutylene terephthalate resin composition configuring a polybutylene terephthalate resin molded article is no more than 0.05 dL/g, and the amount of carboxylic group ends in the resin included in the polybutylene terephthalate resin pellets is adjusted so as to be no more than 25 meq/kg.

2 Claims, No Drawings

POLYBUTYLENE TEREPHTHALATE RESIN PELLETS, AND PRODUCTION METHOD FOR SAID POLYBUTYLENE TEREPHTHALATE RESIN PELLETS

TECHNICAL FIELD

The present invention relates to a polybutylene terephthalate resin pellet and a method of producing the polybutylene terephthalate resin pellet.

BACKGROUND ART

A reactive processing method is known as a method of utilizing a molding machine for producing a resin molded article as a field of reaction. In particular, so-called "reactive extrusion processing" using an extruder has high industrial additional value and is actively used all over the world (see, e.g., Patent Document 1).

Patent Document 1 exemplifies a polybutylene terephthalate resin as one of a variety of usable thermoplastic resins. The polybutylene terephthalate resin has excellent mechanical characteristics, electrical characteristics, heat resistance, weather resistance, water resistance, chemical resistance, and solvent resistance and is widely used as engineering plastic in various purposes such as automobile parts and electrical and electronic parts.

However, kneading for a long time is required for allowing a reaction to sufficiently proceed, resulting in a problem of reducing productivity. Furthermore, in the reactive processing method using a polybutylene terephthalate resin, the heat during the reaction decomposes the polybutylene terephthalate resin, resulting in a problem of deteriorating the physical properties of a polybutylene terephthalate resin molded article as a product.

[Patent Document 1] Japanese Unexamined Patent Application, Publication No. 2006-347151

DISCLOSURE OF THE INVENTION

Problems to be Solved by the Invention

Although implementation of the reactive processing method using a polybutylene terephthalate resin has a possibility of improving the physical properties of the polybutylene terephthalate resin molded article and improving the moldability of a raw material pellet, as described above, inhibition of the thermal decomposition of the polybutylene terephthalate resin is necessary for useful implementation of the reactive processing method using the polybutylene terephthalate resin.

The present invention was made for solving the above-described problems, and it is an object thereof to provide a technology of inhibiting a polybutylene terephthalate resin from being thermally decomposed, while allowing the polybutylene terephthalate resin to react with a reactive compound, in implementation of the reactive processing method using the polybutylene terephthalate resin.

Means for Solving the Problems

The present inventors have diligently studied for solving the above-mentioned problems. As a result, the inventors have found that the above-mentioned problems can be solved by a polybutylene terephthalate resin pellet for producing a polybutylene terephthalate resin molded article containing a polybutylene terephthalate resin (A) and a reactive compound (B) that is reactive with the polybutylene terephthalate resin (A) reacted such that the difference between the intrinsic viscosity of the polybutylene terephthalate resin composition constituting the polybutylene terephthalate resin pellet and the intrinsic viscosity of the polybutylene terephthalate resin composition constituting the polybutylene terephthalate resin molded article is 0.05 dL/g or less; and the resin contained in the polybutylene terephthalate resin pellet has a terminal carboxyl group content of 25 meq/kg or less, and accomplished the present invention. More specifically, the present invention provides the followings.

(1) A polybutylene terephthalate resin pellet for producing a polybutylene terephthalate resin molded article, comprising:

a polybutylene terephthalate resin (A) and a reactive compound (B) that is reactive with the polybutylene terephthalate resin (A) reacted such that the difference between the intrinsic viscosity of the polybutylene terephthalate resin composition constituting the polybutylene terephthalate resin pellet and the intrinsic viscosity of the polybutylene terephthalate resin composition constituting the polybutylene terephthalate resin molded article is 0.05 dL/g or less; and the resin contained in the polybutylene terephthalate resin pellet has a terminal carboxyl group content of 25 meq/kg or less.

(2) The polybutylene terephthalate resin pellet according to aspect (1), wherein the reactive compound (B) is a polyvalent hydroxyl compound.

(3) A method of producing a polybutylene terephthalate resin pellet, comprising:

reacting a polybutylene terephthalate resin (A) and a reactive compound (B) that is reactive with the polybutylene terephthalate resin (A) in an extruder under production conditions satisfying the following inequality expression (I):

$$200 \leq ((T_{die}-T_m) \times (T_{cylinder}/T_m))/(Q/N_s) \leq 300 \qquad (I)$$

wherein $T_{die}$ represents resin temperature when the resin is discharged from a die, $T_{cylinder}$ represents cylinder temperature, $Q$ represents extrusion output, $N_s$ represents screw speed, and $T_m$ represents the melting point of the polybutylene terephthalate resin (A).

(4) The method of producing a polybutylene terephthalate resin pellet according to aspect (3), wherein the extruder is provided with a screw comprising, from the upstream side toward the downstream side, a supplying portion having a raw material-supply port, a plasticizing portion plasticizing a raw material conveyed from the supplying portion side, and a kneading portion kneading the raw material plasticized in the plasticizing portion; and the ratio of the kneading portion to the total length of the screw is 5% or more and 20% or less.

Effects of the Invention

According to the present invention, in implementation of the reactive processing method using a polybutylene terephthalate resin, the polybutylene terephthalate resin can be prevented from thermal decomposition during the reaction of the polybutylene terephthalate resin with a reactive compound.

PREFERRED MODE FOR CARRYING OUT THE INVENTION

Embodiments of the present invention will now be described. The present invention is not limited to the following embodiments.

Polybutylene Terephthalate Resin Pellet

The polybutylene terephthalate resin pellet of the present invention contains a polybutylene terephthalate resin (A) and a reactive compound (B) that is reactive with the polybutylene terephthalate resin (A) reacted so as to satisfy the following requirements 1 and 2.

(Requirement 1)

The difference between the intrinsic viscosity of the polybutylene terephthalate resin composition constituting the polybutylene terephthalate resin pellet and the intrinsic viscosity of the polybutylene terephthalate resin composition constituting the polybutylene terephthalate resin molded article formed by molding the polybutylene terephthalate resin pellet is 0.05 dL/g or less.

(Requirement 2)

The resin contained in the polybutylene terephthalate resin pellet has a terminal carboxyl group content of 25 meq/kg or less.

[Polybutylene Terephthalate Resin (A)]

The polybutylene terephthalate resin (A) is prepared by polycondensation of a dicarboxylic acid component containing at least terephthalic acid or its ester-forming derivative (e.g., a $C_{1-6}$ alkyl ester or an acid halide) and a glycol component containing at least an alkylene glycol having four carbon atoms (1,4-butanediol) or its ester-forming derivative (e.g., an acetylated product). The polybutylene terephthalate resin is not limited to polybutylene terephthalate homopolymer resin and may be a copolymer containing a butylene terephthalate unit in an amount of 60% by mole or more (in particular, 75% by mole or more and 95% by mole or less).

In the polybutylene terephthalate resin (A) used in the present invention, examples of the dicarboxylic acid component (comonomer component) other than the terephthalic acid and its ester-forming derivatives include $C_{8-14}$ aromatic dicarboxylic acids such as isophthalic acid, phthalic acid, 2,6-naphthalene dicarboxylic acid, and 4,4'-dicarboxydiphenyl ether; $C_{4-16}$ alkane dicarboxylic acids such as succinic acid, adipic acid, azelaic acid, and sebacic acid; $C_{5-10}$ cycloalkane dicarboxylic acids such as cyclohexane dicarboxylic acid; and ester-forming derivatives of these dicarboxylic acid components (e.g., $C_{1-6}$ alkyl ester derivatives and acid halides). These dicarboxylic acid components may be used alone or in combination of two or more thereof.

In the polybutylene terephthalate resin (A) used in the present invention, examples of the glycol component (comonomer component) other than 1,4-butanediol include $C_{2-10}$ alkylene glycols such as ethylene glycol, propylene glycol, trimethylene glycol, 1,3-butylene glycol, hexamethylene glycol, neopentyl glycol, and 1,3-octanediol; polyoxyalkylene glycols such as diethylene glycol, triethylene glycol, and dipropylene glycol; alicyclic diols such as cyclohexane dimethanol and hydrogenated bisphenol A; aromatic diols such as bisphenol A and 4,4'-dihydroxybiphenyl; $C_{2-4}$ alkylene oxide adducts of bisphenol A such as 2 mole ethylene oxide adduct of bisphenol A and 3 mole propylene oxide adduct of bisphenol A; and ester-forming derivatives of these glycols (e.g., acetylated product). These glycol components may be used alone or in combination to two or more thereof.

The polybutylene terephthalate resin used in the present invention may have any intrinsic viscosity within a range that does not impair the purposes of the present invention. In addition, a polybutylene terephthalate resin having a desired intrinsic viscosity may be prepared by mixing polybutylene terephthalate resins having different intrinsic viscosities.

The polybutylene terephthalate resin (A) used in the present invention may have any terminal carboxyl group content within a range that does not impair the purposes of the present invention. In the present invention, the polybutylene terephthalate resin (A) preferably has a terminal carboxyl group content of 25 meq/kg or less. In the case of using a polybutylene terephthalate resin having a terminal carboxyl group content within such a range, a reduction in strength due to hydrolysis of the polybutylene terephthalate resin (A) in high-humidity and heat environment hardly occurs.

The melting point ($T_m$) of the polybutylene terephthalate resin varies depending on, for example, the molecular weight and whether a monomer other than terephthalic acid and 1,4-butanediol is used or not. A common polybutylene terephthalate resin has a melting point within a range of 220° C. or more and 230° C. or less. The melting point ($T_m$) employed is a value measured with a differential scanning calorimeter at a temperature rise rate of 20° C./min.

[Reactive Compound (B)]

The reactive compound (B) is a compound reactive to the polybutylene terephthalate resin and may be any compound without specific limitation and is appropriately selected depending on, for example, physical properties that are required in the polybutylene terephthalate resin molded article as a product.

The reactive compound (B) may react with any site of the polybutylene terephthalate resin (A) without any limitation and may react with the carboxyl group or the hydroxyl group at a terminal of the polybutylene terephthalate resin (A) or may be react with an ester bond in the polymer chain of the polybutylene terephthalate resin (A). Regardless of the site of a polybutylene terephthalate resin (A) to which the reactive compound (B) reacts, the polybutylene terephthalate resin (A) or the reaction product of the component (A) and the component (B) is exposed to high temperature for accelerating the reaction. Conventionally, there have been problems of thermal decomposition of the polybutylene terephthalate resin (A) and thermal decomposition of the reaction product of the component (A) and the component (B) at the site derived from the component (A). Accordingly, the present invention can be applied to any reaction. In the present invention, the component (A) and the component (B) are required to react with each other in a molten state. For example, the following "reactive compound (B) that reacts with the carboxyl group or the hydroxyl group at a terminal of a polybutylene terephthalate resin (A)" or "reactive compound (B) that reacts with an ester bond in the polymer chain of a polybutylene terephthalate resin (A)" allows smooth proceeding of the reaction in a molten state.

Examples of the reactive compound (B) that reacts with the carboxyl group or the hydroxyl group at a terminal of a polybutylene terephthalate resin (A) include compounds having hydroxyl groups, carboxylic acid anhydride groups, epoxy groups, isocyanate groups, carbodiimide groups, oxazoline groups, glycidyl groups, amino groups, imino groups, cyano groups, azo groups, thiol groups, sulfo groups, nitro groups, alkoxy groups, ether bonds, ester bonds, amide bonds, and urethane bonds.

Examples of the reactive compound (B) that reacts with an ester bond in the polymer chain of the polybutylene terephthalate resin (A) include reactive compounds (B) that transesterify with polybutylene terephthalate resins (A).

The reaction of the reactive compound (B) and the polybutylene terephthalate resin (A) described above in an extruder can improve the physical properties of the polybutylene terephthalate resin molded article as a product or can improve the moldability of the polybutylene terephthalate resin pellet as a raw material of the polybutylene terephthalate resin molded article. In particular, since the polybutylene terephthalate resin pellet of the present invention contains the component (A) and the component (B) reacted with each other so as to satisfy the above-described requirements 1 and 2, it is possible to prevent thermal decomposition of the polybutylene terephthalate resin (A) and thermal decomposition of the reaction product of the component (A) and the component (B) at the site derived from the component (A).

An example of improving the moldability of the polybutylene terephthalate resin pellet will now be described.

Melt-kneading of a polybutylene terephthalate resin (A) and a polyvalent hydroxyl compound as a reactive compound (B) during the production of a polybutylene terephthalate resin pellet causes transesterification between the polybutylene terephthalate resin (A) and the polyvalent hydroxyl compound, resulting in enhancement of fluidity of the resin composition in a molten state. As a result, the resulting polybutylene terephthalate resin pellet also has excellent fluidity in melting.

The polyvalent hydroxyl compound has two or more hydroxyl groups in one molecule. The use of a polyvalent hydroxyl compound can efficiently improve the fluidity in melting of the polybutylene terephthalate resin pellet, while maintaining the properties of the polybutylene terephthalate resin (A) with a high level of reliability.

The polyvalent hydroxyl compound preferably has a hydroxyl value of 200 or more and more preferably 250 or more. A hydroxyl value of 200 or more tends to further enhance the effect of improving the fluidity and is therefore preferred.

In particular, the polyvalent hydroxyl compound is preferably a glycerin fatty acid ester. The glycerin fatty acid ester is composed of glycerin and/or its dehydrated condensate and fatty acid. A preferred glycerin fatty acid ester is prepared using fatty acid having 12 or more carbon atoms. Examples of the fatty acid having 12 or more carbon atoms include lauric acid, oleic acid, palmitic acid, stearic acid, 12-hydroxystearic acid, behenic acid, and montanoic acid. The fatty acid preferably has 12 to 32 carbon atoms and most preferably 12 to 22 carbon atoms. Specifically, lauric acid, stearic acid, 12-hydroxystearic acid, and behenic acid are preferred. The use of fatty acid having 12 or more carbon atoms tends to sufficiently maintain the heat resistance of the resin and is therefore preferred. Fatty acid having 32 or less carbon atoms has a high effect of improving the fluidity and is therefore preferred.

Preferred examples of the glycerin fatty acid ester include glycerin monostearate, glycerin monobehenate, diglycerin monostearate, triglycerin monostearate, triglycerin stearate partial ester, tetraglycerin stearate partial ester, polyglycerin stearate partial ester, decaglycerin laurate partial ester, and glycerin mono-12-hydroxystearate.

A component (A) and a component (B) may be reacted with each other by any method, and the reaction conditions of a conventionally known method can be appropriately adjusted. The method of producing a polybutylene terephthalate resin pellet of the present invention described below is preferred.

[Polybutylene Terephthalate Resin Pellet]

The polybutylene terephthalate resin pellet of the present invention contains a reaction product of a component (A) and a component (B) reacted so as to satisfy the requirements 1 and 2.

The requirement 1 is that the difference between the intrinsic viscosity of a polybutylene terephthalate resin composition constituting the polybutylene terephthalate resin pellet and the intrinsic viscosity of the polybutylene terephthalate resin composition constituting the polybutylene terephthalate resin molded article formed by molding the polybutylene terephthalate resin pellet is 0.05 dL/g or less. This requirement means that the polybutylene terephthalate resin (A) and the reactive compound (B) sufficiently react with each other during the production of the polybutylene terephthalate resin pellet. In the present invention, the difference between the intrinsic viscosities is preferably 0.04 dL/g or less.

The requirement 2 is that the resin contained in the polybutylene terephthalate resin pellet has a terminal carboxyl group content of 25 meq/kg or less. This requirement means that thermal decomposition of the polybutylene terephthalate resin (A) and thermal decomposition of the reaction product of the component (A) and the component (B) at the site derived from the component (A) are prevented. In the present invention, the terminal carboxyl group content is preferably 24 meq/kg or less.

The polybutylene terephthalate resin pellet of the present invention contains unreacted component (A) and unreacted component (B) in addition to the reaction product of the component (A) and the component (B), of which the ratios are appropriately adjusted depending on, for example, the purpose of the polybutylene terephthalate resin molded article as a product.

[Other Component (C)]

The polybutylene terephthalate resin pellet of the present invention can further contain a known stabilizer and additive within the ranges that do not impair the purposes and effects of the present invention. Examples of the additive include reinforcements, a variety of coloring agents, mold-releasing agents, nucleating agents, antistatic agents, other surfactants, and heterogeneous polymers. Examples of the reinforcement include inorganic fillers (preferably fibrous inorganic fillers (particularly preferably glass fibers)). Such an inorganic filler is mainly used for improving the mechanical properties of the polybutylene terephthalate resin molded article as a product and does not significantly inhibit the reaction between the component (A) and the component (B) and hardly accelerate the thermal decomposition described above.

Method of Producing Polybutylene Terephthalate Resin Pellet

The polybutylene terephthalate resin pellet of the present invention may be produced by any method that can produce a polybutylene terephthalate resin pellet satisfying the above-mentioned requirements 1 and 2. For example, the resin pellet of the present invention can be produced by the method of producing a polybutylene terephthalate resin pellet of the present invention described below.

Since a resin pellet is usually produced with an extruder, the extruder will be briefly described below. The extruder has a cylinder provided with a screw. The screw includes, from the upstream side toward the downstream side, a supplying portion, a plasticizing portion, and a kneading portion. In addition, the cylinder is provided with a hopper for feeding raw materials at the end on the upstream side and is connected to a die at the end on the downstream side.

The supplying portion has a function of conveying the raw materials supplied into the cylinder toward the extrusion direction (the downstream direction). Specifically, the supplying portion conveys the raw materials to the extrusion direction by rotating the screw with a conveying screw element composed of forward flight.

The plasticizing portion has a function of sufficiently melting raw materials by applying a shear force to the raw materials and thereby generating heat. As the plasticizing portion, a screw element having a plasticizing capacity (ability of melting resin) is used. Examples of the screw element include reverse flight, forward kneading discs, reverse kneading discs, and neutral kneading discs. These screw elements having a kneading function may be used in combination thereof. Even in forward flight, a screw element having a plasticizing capacity can be prepared by combining a screw having a deep groove and a screw having a shallow groove.

The kneading portion has a function of sufficiently kneading raw materials in a molten state, and the raw materials are further uniformly mixed here. In also the kneading portion, as in the plasticizing portion, a screw element that can apply, for example, a compressive stress or a shear force to raw materials in a molten state can be used. Since the plasticizing portion and the kneading portion are usually connected to each other with a conveying screw element therebetween, the plasticizing portion and the kneading portion can be clearly distinguished from each other.

A method of producing the resin pellet of the present invention using a common extruder as described above will now be described. A polybutylene terephthalate resin (A) and a reactive compound (B) as raw materials are fed through the hopper. These raw materials are conveyed from the supplying portion to the plasticizing portion by the rotation of a screw.

The raw materials conveyed to the plasticizing portion are further conveyed to the downstream side by rotation of the screw. In this process, the component (A) and the component (B) melt into each other. Thus, the plasticizing portion conveys the raw materials to the kneading portion side while melting the raw materials. In the component (A) and the component (B) molten into each other, since the reaction between the component (A) and the component (B) proceeds, the reaction also proceeds in the plasticizing portion. Application of heat to the component (A) in a molten state or to the reaction product of the component (A) and the component (B) may cause thermal decomposition of the component (A) or the reaction product at the site derived from the component (A). However, the reaction between the component (A) and the component (B) and the thermal decomposition occur mainly in the kneading portion.

The kneading portion allows the reaction between the component (A) and the component (B) to proceed while further uniformly mixing the raw materials. Here, the reaction between the component (A) and the component (B) proceeds. In addition, thermal decomposition of the component (A) and thermal decomposition of the reaction product at the site derived from the component (A) occur. The raw materials are conveyed to the die while reacting with each other and being thermally decomposed and are then discharged from the die in a strand shape.

In order to accelerate the reaction, it is preferred to increase the temperature during the kneading by, for example, increasing the screw speed or the cylinder temperature. However, in order to allow the reaction to proceed while preventing the thermal decomposition, it is necessary to control the residence time depending on the temperature. In the present invention, the time from the supply of raw materials until the discharge from the die is preferably two minutes or less and more preferably less than one minute. If raw materials after sufficient reaction continue to stay in the cylinder, problems such as deterioration of physical properties due to thermal decomposition become disadvantageously remarkable.

Thus, the kneading portion is a section most involved in decomposition of the component (A) and so on and the reaction between the component (A) and the component (B). In the present invention, the ratio of the kneading portion to the total length of the screw is preferably 5% or more and 20% or less.

The production method of the present invention can prevent thermal decomposition of the component (A) and thermal decomposition of the reaction product at the site derived from the component (A), while allowing the reaction between the component (A) and the component (B) to proceed, by controlling the production conditions so as to satisfy the following inequality expression (I):

$$200 \le ((T_{die}-T_m) \times (T_{cylinder}/T_m))/(Q/N_s) \le 300 \quad (I)$$

wherein $T_{die}$ represents resin temperature when the resin is discharged from a die, $T_{cylinder}$ represents cylinder temperature, Q represents extrusion output, $N_s$ represents screw speed, and $T_m$ represents the melting point of the polybutylene terephthalate resin (A).

$((T_{die}-T_m) \times (T_{cylinder}/T_m))$ denotes the heat applied to the component (A) in a molten state (during reaction). $(T_{die}-T_m)$ denotes a rise in temperature of the molten component (A) until being discharged from the die. Accordingly, the heat applied to the component (A) in a molten state can be represented by evaluating $(T_{die}-T_m)$. However, the resin temperature $T_{die}$ is affected by two thermal histories: viscous heat generation due to rotation of the screw element and heat transfer from the barrel face due to a heater. Accordingly, in order to inhibit the thermal decomposition while allowing the reaction between the component (A) and the component (B) to proceed, it is necessary to take the cylinder temperature into consideration. In the present invention, the cylinder temperature can be taken into account by multiplying the $(T_{die}-T_m)$ by $(T_{cylinder}/T_m)$.

$(Q/N_s)$ denotes the extrusion output per one rotation of the screw. Accordingly, $((T_{die}-T_m) \times (T_{cylinder}/T_m))/(Q/N_s)$ denotes the heat applied to the component (A) in a molten state (during reaction) per the extrusion output in one rotation of the screw. By controlling this heat within a range of 200 to 300, the requirements 1 and 2 are satisfied. As a result, the thermal decomposition can be prevented while allowing the polybutylene terephthalate resin (A) to react with the reactive compound (B).

For example, the above-described heat can be controlled in the range of 200 to 300 by appropriately adjusting each parameter. The $T_{die}$ is the temperature of the resin when discharged from the die of the extruder and can be controlled by changing, for example, the cylinder temperature, the screw speed, and the type of the screw element used in the kneading portion. More specifically, a larger quantity of heat can be applied to raw materials by setting the cylinder temperature high, resulting in a tendency of raising the $T_{die}$. Alternatively, a stronger force is applied to raw materials by setting the screw speed high, resulting in a tendency of raising the $T_{die}$. Alternatively, use of screw element having a stronger kneading action has a tendency of raising the $T_{die}$. In addition, elongation of the screw element of the kneading portion also increases the heat applied to raw materials, resulting in a tendency of raising the $T_{die}$.

The $T_m$ is determined by the polybutylene terephthalate resin actually used as the component (A). The $T_{cylinder}$ and $(Q/N_s)$ are easily adjustable parameters by setting the conditions of the extruder.

As described above, a desired polybutylene terephthalate resin pellet can be efficiently produced by controlling the value of $((T_{die}-T_m) \times (T_{cylinder}/T_m))/(Q/N_s)$ within a range of 200 to 300. In particular, if the $T_m$ is within the above-described usual range (the range of 220° C. or more and 230° C. or less), the value of $((T_{die}-T_m) \times (T_{cylinder}/T_m))/(Q/N_s)$ is preferably controlled in the range of 200 to 300 by the $T_{die}$, $T_{cylinder}$, Q, and $N_s$ within the following ranges.

The $T_{die}$ is 295° C. or more and 340° C. or less; the $T_{cylinder}$ is 220° C. or more and 300° C. or less; the Q is 50 (kg/hr) or more and 500 (kg/hr) or less for a barrel inner diameter of 47 mm; and $N_s$ is 200 rpm or more and 800 rpm or less.

A case of another extruder having a different size, for example, a larger size will now be described. Here, the extruder when inequality expression (I) was derived is referred to as a "prototype model"; and a large-sized extruder is referred to as a "mass production model". In also such a mass production model, it is possible to derive a relational expression corresponding to inequality expression (I) by performing experiments with the large-sized mass production model, but it takes time and cost. Accordingly, a relational expression (IV) that can be used in a large-sized mass production model can be derived by the method described below from relational expression (I) derived with a small-sized prototype model.

When the external diameter D of a screw element is changed from d1 to d2, the following relational expression (II) is established between the discharge quantity $Q_m$ of the prototype model and the discharge quantity $Q_M$ of the mass production model; and the following relational expression (III) is established between the screw speed $Ns_m$ of the prototype model and the screw speed $Ns_M$ of the mass production model.

$$Q_M = \left(\frac{d2}{d1}\right)^\delta Q_m \quad\quad\quad\text{(II)}$$

$$Ns_M = \left(\frac{d2}{d1}\right)^{-\varepsilon} Ns_m \quad\quad\quad\text{(III)}$$

The values of δ and ε in relational expressions (II) and (III) are determined such that specific energies imparted to molten resins are substantially the same. The values δ and ε may be determined theoretically or may be determined experimentally. In the theoretical determination, in general, an adiabatic state is supposed, and the parameters δ and ε are derived such that specific energies or, for example, total shear forces and residence times, as an objective function, coincide between the small-sized model and the large-sized model. Alternatively, a difference in heat transfer quantity between a small-sized model and a large-sized model is supposed, and the parameters δ and ε can also be derived such that specific energies, as an objective function, coincide between the small-sized model and the large-sized model. In the experimental determination, for example, the parameters δ and ε are statistically calculated such that specific energies or parameters showing physical properties, as an objective function, coincide between the small-sized model and the large-sized model.

By deriving the relational expressions (II) and (III) established between a small-sized prototype model and a large-sized mass production model, the following relational expression (IV) that is established for the large-sized model can be easily derived.

$$200 \leq \frac{(T_{die} - T_m)}{\left(\frac{Q/Ns}{\left(\frac{d2}{d1}\right)^{\delta\varepsilon}}\right)} \frac{T_{cylinder}}{T_m} \leq 300 \quad\quad\quad\text{(IV)}$$

EXAMPLES

The present invention will now be described in more detail by examples, but is not limited to the following examples.
Materials
Polybutylene terephthalate resin (PBT) (A): DERANEX (manufactured by WinTech Polymer Ltd.), melting point ($T_m$): 224° C.
Reactive compound (B): polyglycerin stearate partial ester (Rikemal AF-78, manufactured by Riken Vitamin Co., Ltd.)
Other component (C): Glass fiber
Extruder
A twin-screw extruder manufactured by The Japan Steel Works, Ltd. was used. In the twin-screw extruder, the cylinder was provided with a screw having a length satisfying L/D=45.5 (where L denotes the total length of the screw, and D denotes the diameter of the screw; in this example, D=47 mm). The screw comprised, from the upstream side toward the downstream side, a supplying portion (L/D=13.5, forward flight: 10 pieces), a plasticizing portion (L/D=5, kneading element: 6 pieces), a conveying element between the plasticizing portion and a kneading portion (L/D=11.25, forward flight: 8 pieces), and the kneading portion (the following A to C).
[Kneading Portion A]
L/D=4.0, kneading element: 4 pieces
[Kneading Portion B]
L/D=2.0, kneading element: 2 pieces
[Kneading Portion C]
L/D=4.0, notched one-thread reverse flight (manufactured by The Japan Steel Works, Ltd., Backward Mixing Single flight screw (BMS)): 2 pieces
Production of Polybutylene Terephthalate Resin Pellet
Raw materials having compositions shown in Table 1 were fed to an extruder, and polybutylene terephthalate resin pellets were produced under conditions shown in Table 1. The "Kneading portion residence time" shown in Table 1 is the time from the start of supply of carbon black to the end of the plasticizing portion on the downstream side until the start of a change in color of the extrusion discharged from the die into black. The "Total residence time" shown in Table 1 is the time from the supply of carbon black to the end of the supplying portion on the upstream side until the discharge of a black extrusion from the die. In all Examples and Comparative Examples, the time from the raw material supply until discharge was within 2 minutes, and in all Examples, the time from the raw material supply until discharge was less than 1 minute. The calculation result 1 shown in Table 1 is the calculation result of the following expression (II), and the calculation result 2 is the calculation result of the following expression (III).

$$(T_{die}-T_m)/(Q/N_s) \quad\quad\quad\text{(II)}$$

$$(T_{die}-T_m)\times(T_{cylinder}/T_m))/(Q/N_s) \quad\quad\quad\text{(III)}$$

The terminal carboxyl group content (CEG) of the resin contained in each polybutylene terephthalate resin pellet is shown in Table 1. Herein, the terminal carboxyl group content was determined by titration, with a 0.01 N aqueous sodium hydroxide solution, of a solution prepared by dissolving a pulverized polybutylene terephthalate resin pellet sample in benzyl alcohol at 215° C. for 10 minutes.

The intrinsic viscosity (IV) of the polybutylene terephthalate resin composition constituting each polybutylene terephthalate resin pellet is shown in Table 1. The intrinsic viscosity (IV) was measured using o-chlorophenol as the solvent at 25° C.

Production of Polybutylene Terephthalate Resin Molded Article
Each polybutylene terephthalate resin molded article (130 mm×13 mm×1.6 mm) was produced by injection molding using each polybutylene terephthalate resin pellet. In the injection molding, the cylinder temperature was 260° C., screw speed was 100 rpm, and the die temperature was 60° C.

The intrinsic viscosity of the polybutylene terephthalate resin composition constituting each polybutylene terephthalate resin molded article was measured by the same method as in the resin pellet. The measurement results are shown in Table 1. The difference ΔIV in intrinsic viscosity (IV) is also shown in Table 1.

As shown in Table 1, it was observed that the problem of thermal decomposition can be prevented while the reaction between a component (A) and a component (B) being allowed to proceed by controlling the value of $((T_{die}-T_m)\times(T_{cylinder}/T_m))/(Q/N_s)$ within a range of 200 to 300.

TABLE 1

| | Screw speed | | | Reaction temperature | | | High rate | | |
|---|---|---|---|---|---|---|---|---|---|
| | Comparative Example 1 | Example 1 | Comparative Example 2 | Comparative Example 3 | Example 1 | Comparative Example 4 | Comparative Example 5 | Example 2 | Comparative Example 6 |
| PBT | 100 | 100 | 100 | 100 | 100 | 100 | 100 | 100 | 100 |
| Reactive compound | 1.36 | 1.36 | 1.36 | 1.36 | 1.36 | 1.36 | 1.36 | 1.36 | 1.36 |
| Glass fiber | 21.09 | 21.09 | 21.09 | 21.09 | 21.09 | 21.09 | 21.09 | 21.09 | 21.09 |
| Kneading portion | A | A | A | A | A | A | A | A | A |
| Extrusion output Q [kg/hr] | 100 | 100 | 100 | 100 | 100 | 100 | 300 | 300 | 300 |
| Rotating speed Ns [rpm] | 200 | 300 | 400 | 300 | 300 | 300 | 400 | 600 | 800 |
| Cylinder temperature (setting) [° C.] | 250 | 250 | 250 | 220 | 250 | 280 | 250 | 250 | 250 |
| Resin temperature at discharge from die [° C.] | 290 | 307 | 317 | 294 | 307 | 314 | 306 | 327 | 345 |
| Residence time at kneading portion [sec] | 29 | 22 | 20 | 22 | 22 | 22 | 12 | 9 | 8 |
| Total residence time [sec] | 57 | 50 | 48 | 50 | 50 | 50 | 24 | 19 | 17 |
| Calculation result 1 | 124 | 237 | 356 | 198 | 237 | 258 | 104 | 198 | 312 |
| Calculation result 2 | 136 | 260 | 390 | 191 | 260 | 317 | 114 | 217 | 342 |
| CEG[meq/kg] | 21.3 | 22.6 | 25.2 | 21.7 | 22.6 | 26 | 21.6 | 22.5 | 26.1 |
| IV  Pellet | 0.79 | 0.76 | 0.73 | 0.79 | 0.76 | 0.72 | 0.81 | 0.76 | 0.73 |
| Resin molded article | 0.71 | 0.71 | 0.71 | 0.71 | 0.71 | 0.71 | 0.71 | 0.71 | 0.71 |
| ⊿ IV | 0.08 | 0.05 | 0.02 | 0.08 | 0.05 | 0.01 | 0.1 | 0.05 | 0.02 |

| | Residence time | | | Screw design | | |
|---|---|---|---|---|---|---|
| | Comparative Example 7 | Example 3 | Comparative Example 8 | Comparative Example 9 | Example 4 | Comparative Example 10 |
| PBT | 100 | 100 | 100 | 100 | 100 | 100 |
| Reactive compound | 1.36 | 1.36 | 1.36 | 1.36 | 1.36 | 1.36 |
| Glass fiber | 21.09 | 21.09 | 21.09 | 21.09 | 21.09 | 21.09 |
| Kneading portion | B | B | B | C | C | C |
| Extrusion output Q [kg/hr] | 100 | 100 | 100 | 100 | 100 | 100 |
| Rotating speed Ns [rpm] | 200 | 300 | 400 | 200 | 300 | 400 |
| Cylinder temperature (setting) [° C.] | 250 | 250 | 250 | 250 | 250 | 250 |
| Resin temperature at discharge from die [° C.] | 285 | 303 | 315 | 295 | 307 | 316 |
| Residence time at kneading portion [sec] | 28 | 21 | 18 | 33 | 28 | 25 |
| Total residence time [sec] | 56 | 49 | 46 | 61 | 56 | 53 |
| Calculation result 1 | 114 | 225 | 348 | 134 | 237 | 352 |
| Calculation result 2 | 125 | 247 | 382 | 147 | 260 | 386 |
| CEG[meq/kg] | 22 | 22.6 | 25.8 | 22 | 23.5 | 26.7 |
| IV  Pellet | 0.79 | 0.76 | 0.73 | 0.77 | 0.75 | 0.71 |
| Resin molded article | 0.71 | 0.71 | 0.71 | 0.71 | 0.71 | 0.71 |
| ⊿ IV | 0.08 | 0.05 | 0.02 | 0.06 | 0.04 | 0 |

The invention claimed is:

1. A method of producing a polybutylene terephthalate resin pellet, comprising:

reacting a polybutylene terephthalate resin (A) and a reactive compound (B) that is reactive with the polybutylene terephthalate resin (A) in an extruder under production conditions satisfying the following inequality expression (I):

$$200 \leq ((T_{die} - T_m) \times (T_{cylinder}/T_m))/(Q/N_s) \leq 300 \quad (I)$$

wherein, $T_{die}$ represents resin temperature in degrees Celsius when the resin is discharged from a die, $T_{cylinder}$ represents cylinder temperature in degrees Celsius, Q represents extrusion output in kilograms/hour (kg/hr), Ns represents screw speed in revolutions per minute (rpm), and $T_m$ represents the melting point of the polybutylene terephthalate resin (A) in degrees Celsius and wherein the units on the bounds of the inequality are consistent with the above units.

2. The method of producing a polybutylene terephthalate resin pellet according to claim 1, wherein the extruder is provided with a screw comprising, a supplying portion having a raw material-supply port, a plasticizing portion plasticizing a raw material conveyed from the supplying portion side, and a kneading portion kneading the raw material plasticized in the plasticizing portion, from the upstream side toward the downstream side in this order; and the ratio of the kneading portion to the total length of the screw is 5% or more and 20% or less.

* * * * *